United States Patent [19]

Johanson et al.

[11] Patent Number: 4,548,513

[45] Date of Patent: Oct. 22, 1985

[54] METHOD AND APPARATUS FOR MEASURING RESPONSE TIME

[75] Inventors: Edward W. Johanson, New Lenox; Charles August, Darien, both of Ill.

[73] Assignee: The United States of America as represented by the United States Department of Energy, Washington, D.C.

[21] Appl. No.: 522,282

[22] Filed: Aug. 11, 1983

[51] Int. Cl.[4] ................................................ G04F 8/00
[52] U.S. Cl. ........................................ 368/9; 368/118
[58] Field of Search ............... 368/9, 10, 107–113, 368/118; 377/20, 25; 328/3; 324/451, 105; 364/494

[56] References Cited

U.S. PATENT DOCUMENTS 3,553,582  1/1971  Gouillou .............................. 368/118
3,564,399  2/1971  Laukien ........................... 368/118 X
3,581,196  5/1971  Spaid ................................ 368/118 X
3,942,123  3/1976  Georgi ................................... 377/25

Primary Examiner—Vit W. Miska
Attorney, Agent, or Firm—Jeannette M. Walder; Walter L. Rees; Judson R. Hightower

[57] ABSTRACT

A method of measuring the response time of an electrical instrument which generates an output signal in response to the application of a specified input, wherein the output signal varies as a function of time and when subjected to a step input approaches a steady-state value, comprises the steps of: (a) applying a step input of predetermined value to the electrical instrument to generate an output signal; (b) simultaneously starting a timer; (c) comparing the output signal to a reference signal to generate a stop signal when the output signal is substantially equal to the reference signal, the reference signal being a specified percentage of the steady-state value of the output signal corresponding to the predetermined value of the step input; and (d) applying the stop signal when generated to stop the timer.

7 Claims, 5 Drawing Figures

METHOD AND APPARATUS FOR MEASURING RESPONSE TIME

CONTRACTUAL ORGIN OF THE INVENTION

The U.S. Government has rights in this invention pursuant to Contract No. W-31-109-ENG-38 between the U.S. Department of Energy and the University of Chicago representing Argonne National Laboratory.

BACKGROUND OF THE INVENTION

This invention relates to a method and apparatus for measuring the response time of an electrical instrument, and, more particularly to determining the time constant of a thermocouple. The time response of an instrument is the output, expressed as a function of time, resulting from the application of a specified input under specified operating conditions. Response time is the time required for the output to reach a specified percentage of the steady-state or equilibrium value. When the percentage is set at 63.3%, the response time is called one time constant.

One of the most important time responses of an electrical instrument is the step response: the time response of the device when subjected to an instantaneous change in input from one value to another. For example, a thermocouple may be sujected to abrupt changes in temperature. An abrupt change in temperature is tantamount to a step input. In such applications it is essential to know if the thermocouple can respond quickly enough to measure the change. Since the time response of a thermocouple depends on the thermocouple's mass and heat transfer characteristics, it is necessary to calibrate the thermocouple to determine its response time.

Prior art methods of calibrating a thermocouple involve observing the time response of the thermocouple on an oscilloscope or with a printer and then determining the response time of the thermocouple by visual inspection. Such methods are cumbersome and inconvenient to use.

It is therefore an object of the present invention to provide an apparatus for measuring the response time of an electrical instrument.

It is also an object of the present invention to provide a method for measuring the response time of an electrical instrument.

It is another object of the present invention to provide a method and apparatus for measuring the response time of a thermocouple.

Additional objects are set forth in the following description, and in part will become apparent to those skilled in the art upon examination of the following or learned by practicing the invention.

SUMMARY OF THE INVENTION

In accordance with the purposes of the present invention, a method of measuring the response time of an electrical instrument which generates an output signal in response to the application of a specified input, wherein the output signal varies as a function of time and when subjected to a step input approaches a steady-state value, comprises the steps of: (a) applying a step input of a predetermined value of the electrical instrument to generate an output signal; (b) simultaneously starting a timer; (c)comparing the output signal to a reference signal to generate a stop signal when the output signal is substantially equal to the reference signal, the reference signal being a specified percentage of the steady-state value of the output signal corresponding to the predetermined value of the step input; and (d) applying the stop signal when generated, to stop the timer. When the electrical instrument is a thermocouple and the specified percentage is 63.3, a method of determining the thermocouple's time constant is achieved.

An apparatus for measuring the response time of an electrical instrument which generates an output signal in response to the application of a specified input, wherein the output signal varies as a function of time and when subjected to a step input approaches a steady-state value comprises: (a) means for applying a step input of a predetermined value to the electrical instrument to generate an output signal; (b) a timer; (c) means for starting the timer, said timer being started simultaneously with application of said step input; and (d) comparator means coupled to the electrical instrument and the timer to compare the output signal to a reference signal to generate a stop signal for application to the timer for stopping same when the output signal is substantially equal to the reference signal, the reference signal being a specified percentage of the steady-state value of the output signal corresponding to the predetermined value of the step input and (e) means for applying the stop signal when generated to the timer.

DESCRIPTION OF THE DRAWINGS

The present invention is illustrated in the accompanying drawings wherein.

DESCRIPTION OF THE PREFERRED EMBODIMENT

Figure 1:
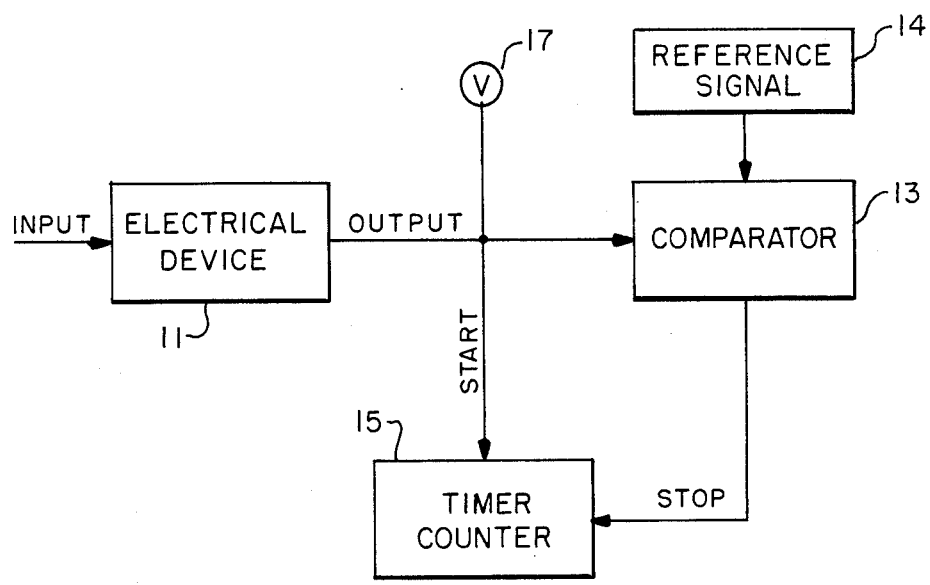
FIG. 1 is a block diagram of the apparatus of the invention.

Referring to FIG. 1, a step input (such as the one characterized by FIG. 2A) is applied to electrical instrument 11 which generates an output signal. The output signal is characterized in that it responds according to the curve shown in FIG. 2. After the step input is applied, the output signal generated is applied both to start timer 15 and to comparator 13, where it is compared with reference signal 14. When the output and reference signals are equal, comparator 13 generates a stop signal which is applied to timer 15 which stops it. The reference signal 14 is generally set at a value which is some percentage of the steady-state output value for that step input. If the steady-state output value is not known for the particular step input, it can be determined by reading voltmeter 17 after sufficient time has passed. Once the steady-state output value is known, the timer can be reset to zero, the reference signal set and the measurement repeated.

Figure 2:
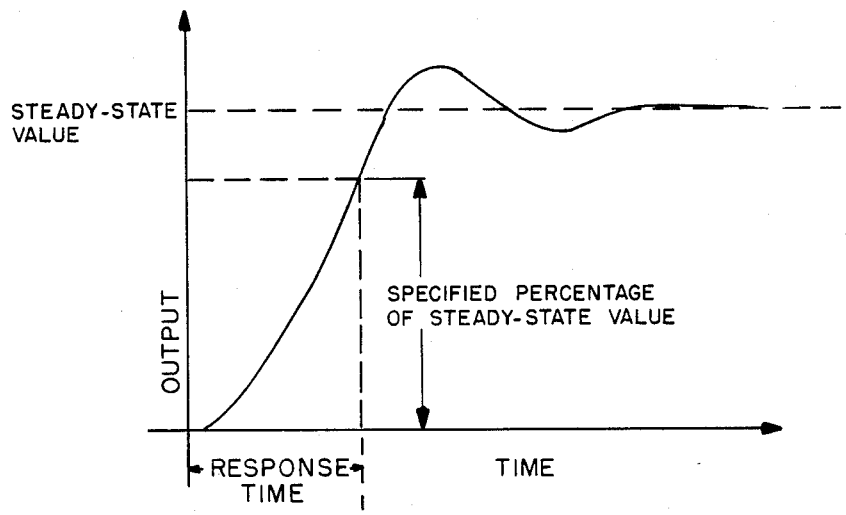
FIG. 2 is a graph of a typical time response to a step input.
Figure 4:
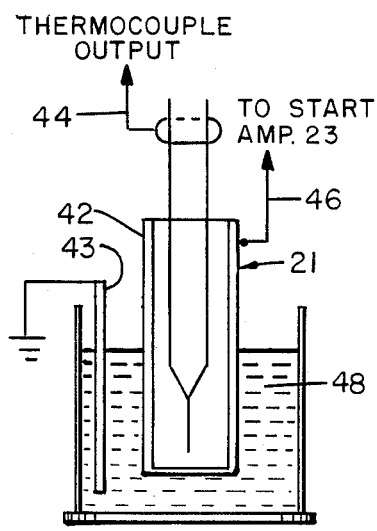
FIG. 4 is a diagram of test apparatus used for applying a step input to a thermocouple.
Figure 2A:
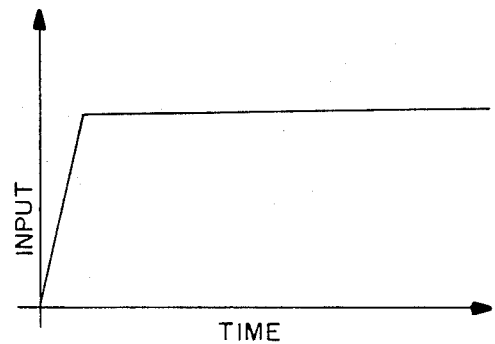
FIG. 2A is a graph of a step input.

FIG. 2 shows, graphically, the relationship between response time and steady-state output value on a typical time response curve to a step input. A step input is a sudden change in input. In the case of a thermocouple, a step input would correspond to a sudden change in temperature, such as would be caused by placing one end of a thermocouple that had been at room temperature into a breaker of boiling water (as shown in FIG. 4).

Figure 3:
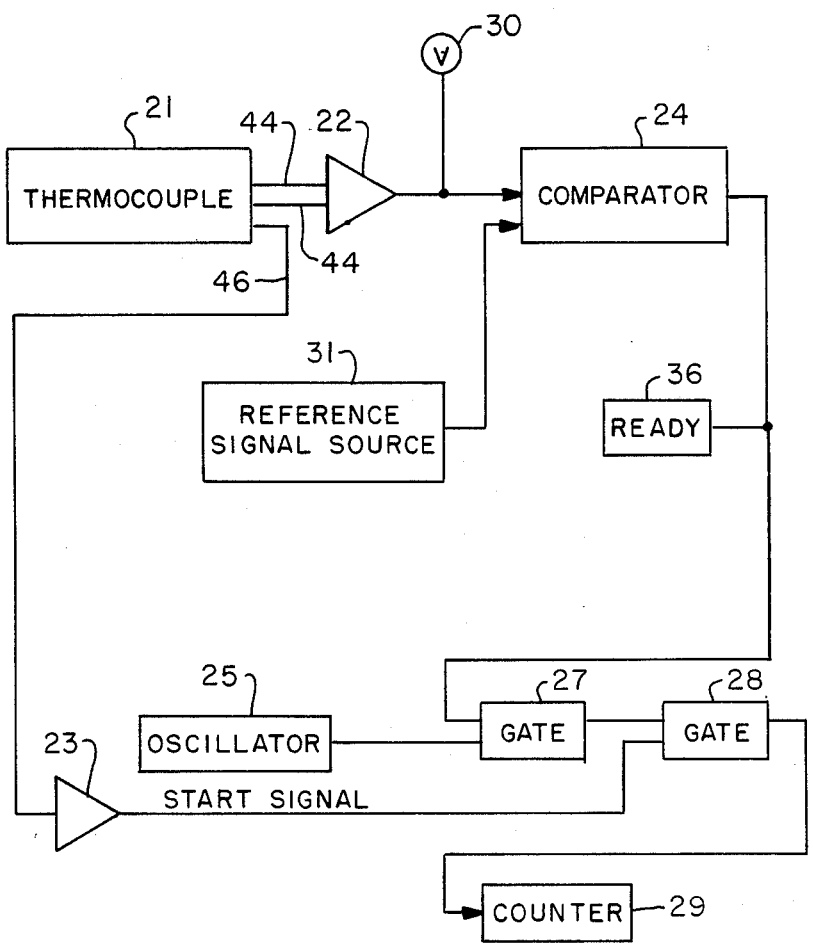
FIG. 3 is a more detailed block diagram of the present invention as applied to a thermocouple.

Referring to FIG. 3, thermocouple 21 has its output 44 connected to amplifier 22. The output of amplifier 22 is measured by voltmeter 30 which is used to determine the steady-state output value of the thermocouple in response to a particular temperature input. If the steady-state value is known, or once it has been determined, reference signal source 31 is set at some specified percentage of the steady-state value. For a thermocouple, 63.3% is chosen and corresponds to one time constant.

It is also necessary to develop a start signal to start the timer when the thermocouple is subjected to a step input. This is accomplished by connecting output 46 to start amplifier 23. Output 46 is connected to ground through conductive outer shell 42 of the thermocouple 21 (as shown in FIG. 4). This ground signal provides the signal to start amplifier 23.

The start signal from amplifier 23 is coupled to gate 28 to open the gate. Gate 27 is an open state and thus pulses from oscillator 25 are coupled to counter 29 through gates 27 and 28. Counter 29 counts the number of pulses received.

The output 44 from thermocouple 21 is coupled to comparator 24 through amplifier 22. When the output signal applied to comparator 24 equals the reference signal from reference signal source 31, a stop signal is developed which closes gate 27 cutting off the oscillator pulses to counter 29. A ready light 36 is also connected to the comparator output to signal when the thermocouple is cooled sufficiently to begin a calibration test, i.e., when the thermocouple output is less than the reference voltage. The total number of pulses counted by counter 29 is a measure of the response time of the thermocouple.

Referring to FIG. 4, thermocouple 21 is inserted into fluid 48 (for example, water) at a specified temperature (for example, 100° C.) for a sustained period of time. Thermocouple outputs 44 are connected to amplifier 22 (see FIG. 3). The thermocouple outer shell 42 is connected to ground through fluid 48 and electrode 43. Thermocouple output 46 provides the signal to start amplifier 23 (see FIG. 3).

EXAMPLE

A typical thermocouple response time test would proceed essentially as follows. A thermocouple with both hot and cold junctions at room temperature has a zero output signal. Calibration begins by determining the steady-state output value for a given temperature. For convenience, the thermocouple hot junction is placed in boiling water at 100° C. After it becomes thermally stabilized, the steady-state output value is measured. The thermocouple is then removed from the boiling water and allowed to cool. When the comparator no longer generates a stop signal, indicating the thermocouple is cool enough to begin a test, the ready light signals. The reference signal is then set to 63.3% of the value just measured so that one time constant can be determined. Once the thermocouple has cooled, the test begins. The thermocouple hot junction is placed in the boiling water. The thermocouple generates an output signal which starts the timer and the comparator. When the comparator stops the counter, the time constant for the thermocouple can be read.

The embodiments of this invention in which an exclusive property or privilege is claimed are defined as follows:

1. A method of measuring the response time of a thermocouple which generates an output signal in response to the application of a specified input, wherein the output signal varies as a function of time and when subjected to a step input approaches a steady-state value, comprises the steps of:
   (a) applying a step input of a predetermined value to the thermocouple to generate an output signal;
   (b) simultaneously starting a timer;
   (c) comparing the output signal to a reference signal to generate a stop signal when the output signal is substantially equal to the reference signal, the reference signal being a specified percentage of the steady-state value of the output signal corresponding to the predetermined value of the step input; and
   (d) applying the stop signal when generated to stop the timer.

2. The method of claim 1 wherein the specified percentage is 63.3.

3. The method of claim 2 wherein the step input of a predetermined value comprises placing one junction of the thermocouple in water at 100° C. and the other end in air at room temperature.

4. Apparatus for measuring the response time of a thermocouple which generates an output signal in response to the application of a specified input, wherein the output signal varies as a function of time and when subjected to a step input approaches a steadystate value comprising:
   (a) means for applying a step input of a predetermined value to the thermocouple to generate an output signal;
   (b) a timer;
   (c) means for starting the timer, said timer being started simultaneously with the application of said step input;
   (d) comparator means coupled to the thermocouple and to the timer to compare the output signal to a reference signal to generate a stop signal for application to the timer for stopping same when the output is substantially equal to the reference signal, the reference signal being a specified percentage of the steadystate value of the output signal corresponding to the predetermined value of the step input; and
   (e) means for applying the stop signal when generated to the timer.

5. The apparatus of claim 4 wherein the thermocouple includes a thermocouple junction and a conductive outer shell separate from said junction, the conductive outer shell being responsive to the application of the step input to develop a start signal, and wherein said timer comprises a counter, a first gate having an output coupled to said counter, a second gate having an output coupled to said first gate, an oscillator for generating a count signal coupled to said second gate, circuit means coupling said conductive outer shell to said first gate for applying said start signal thereto, said comparator being coupled to said second gate for applying said stop signal thereto, said first gate being responsive to said start signal to couple said count signal to said counter, and said second gate being responsive to said stop signal to block said count signal from said counter.

6. The apparatus of claim 5 wherein the specified percentage is 63.3.

7. The apparatus of claim 5 wherein the means for applying a step input of a predetermined value comprises placing one end of the thermocouple and the conductive outer shell in water at 100° C. and the other end in air at room temperature.

* * * * *